US010406620B2

(12) United States Patent
Tsuji et al.

(10) Patent No.: US 10,406,620 B2
(45) Date of Patent: Sep. 10, 2019

(54) HORIZONTAL FILLET WELDING METHOD, HORIZONTAL FILLET WELDING SYSTEM, AND PROGRAM

(71) Applicant: Kobe Steel, Ltd., Kobe-shi (JP)

(72) Inventors: Katsuyuki Tsuji, Fujisawa (JP); Masayuki Shigeyoshi, Fujisawa (JP); Atsushi Fukunaga, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/568,495

(22) PCT Filed: Apr. 22, 2016

(86) PCT No.: PCT/JP2016/062850
§ 371 (c)(1),
(2) Date: Oct. 23, 2017

(87) PCT Pub. No.: WO2016/175156
PCT Pub. Date: Nov. 3, 2016

(65) Prior Publication Data

US 2018/0141146 A1 May 24, 2018

(30) Foreign Application Priority Data

Apr. 30, 2015 (JP) ................................ 2015-093672

(51) Int. Cl.
*B23K 9/02* (2006.01)
*B23K 9/032* (2006.01)
(Continued)

(52) U.S. Cl.
CPC ............ *B23K 9/0216* (2013.01); *B23K 9/025* (2013.01); *B23K 9/028* (2013.01); *B23K 9/0256* (2013.01);
(Continued)

(58) Field of Classification Search
CPC ......................... B23K 9/02–022; B23K 9/025; B23K 9/0256; B23K 9/095–0953; B23K 9/028; B23K 9/0286; B23K 9/032–0325
See application file for complete search history.

(56) References Cited

U.S. PATENT DOCUMENTS 4,843,210 A * 6/1989 Church ................ B23K 9/0209 219/126
4,883,938 A * 11/1989 Sarugaku ................ B23K 9/12 219/124.34
(Continued)

FOREIGN PATENT DOCUMENTS

DE OE 321 068 3/1975
JP S49-023747 6/1972
(Continued)

OTHER PUBLICATIONS

NPL English translation of JP 2010-094697 to Yamanaka Nobuyoshi, published Apr. 30, 2010.*
(Continued)

*Primary Examiner* — Michael A Laflame, Jr.
(74) *Attorney, Agent, or Firm* — Oblon, McClelland, Maier & Neustadt, L.L.P.

(57) ABSTRACT

A welding system that, using a junction at which a standing plate and a bottom plate meet as a welding line, makes an electrode weave centered on the welding line and thereby welds along the welding line. In this welding system, control is performed such that the arc voltage at a standing-plate-side weaving edge is equal to or less than the arc voltage at a welding-line center position, such that the arc voltage at a bottom-plate-side weaving edge becomes equal to or greater than the arc voltage at the welding-line center position, and such that the arc voltage at the standing-plate-side weaving edge becomes lower than the arc voltage at the bottom-
(Continued)

plate-side weaving edge. The system can suppress occurrence of inferior bead appearance and of welding defects in horizontal fillet welding.

7 Claims, 14 Drawing Sheets

(51) Int. Cl.
*B23K 9/025* (2006.01)
*B23K 9/028* (2006.01)
*B23K 9/095* (2006.01)
*B23K 9/173* (2006.01)

(52) U.S. Cl.
CPC ............ *B23K 9/032* (2013.01); *B23K 9/0953* (2013.01); *B23K 9/173* (2013.01)

(56) References Cited

U.S. PATENT DOCUMENTS 5,066,847 A * 11/1991 Kishi .................... B23K 9/127 219/124.34
5,603,853 A * 2/1997 Mombo-Caristan ........................ B23K 15/006 219/121.64
5,653,902 A * 8/1997 Chang .................. B23K 9/1276 219/124.34
5,780,808 A * 7/1998 Moon .................. B23K 9/1276 219/124.34
2004/0074885 A1* 4/2004 Takatani ................ B23K 9/022 219/130.5
2013/0193124 A1* 8/2013 Peters .................... B23K 26/20 219/121.63

FOREIGN PATENT DOCUMENTS

| | | | |
|---|---|---|---|
| JP | 51-65052 | | 6/1976 |
| JP | 11-179542 | A | 7/1999 |
| JP | 2002-321055 | A | 11/2002 |
| JP | 2010-94697 | A | 4/2010 |

OTHER PUBLICATIONS

International Search Report dated Jul. 5, 2016 in PCT/JP2016/062850, filed Apr. 22, 2016.
Office Action dated Jun. 4, 2019 in Japanese Patent Application No. 2015-093672 with English Translation, citing document Ao therein. 12 pages.

* cited by examiner

FIG. 9

| PRACTICAL EXAMPLE/ COMPARATIVE EXAMPLE | TEST No. | ARC-VOLTAGE CONTROL CONDITIONS DURING WEAVING OPERATION | | | | | | | EVALUATION | | | |
|---|---|---|---|---|---|---|---|---|---|---|---|---|
| | | ARC-VOLTAGE WAVEFORM PATTERN | AVERAGE VOLTAGE | ARC VOLTAGES AT WELDING-LINE CENTER POSITION AND WEAVING EDGES | | | | | FLANK ANGLE | | SPATTER-ADHESION-INDUCED APPEARANCE DEFECT | WELDING DEFECT |
| | | | | ARC VOLTAGE $V_O$ | ARC VOLTAGE $V_{Lower}$ | | ARC VOLTAGE $V_{Upper}$ | | (DEGREE) | EVALUATION | | |
| | | | (V) | (V) | (V) | (%) | (V) | (%) | | | | |
| PRACTICAL EXAMPLE | 1 | A | 33.1 | 32.5 | 38.3 | 118 | 30.6 | 94 | 120 | ◎ | ◎ | ○ |
| PRACTICAL EXAMPLE | 2 | A | 34.2 | 32.5 | 40.3 | 124 | 28.6 | 88 | 130 | ◎ | ◎ | ○ |
| PRACTICAL EXAMPLE | 3 | A | 30.6 | 32.5 | 32.5 | 100 | 27.5 | 85 | 132 | ◎ | ◎ | ○ |
| PRACTICAL EXAMPLE | 4 | A | 33.1 | 32.5 | 34.4 | 106 | 32.5 | 100 | 135 | ◎ | ◎ | ○ |
| PRACTICAL EXAMPLE | 5 | B | 33.1 | 32.5 | 37.9 | 117 | 31.3 | 96 | 126 | ◎ | ◎ | ○ |
| PRACTICAL EXAMPLE | 6 | C | 34.2 | 32.5 | 40.6 | 125 | 29.4 | 90 | 134 | ◎ | ○ | ○ |
| PRACTICAL EXAMPLE | 7 | C | 33.1 | 32.5 | 32.6 | 100 | 29.8 | 92 | 113 | ◎ | ○ | ○ |
| PRACTICAL EXAMPLE | 8 | C | 33.3 | 32.5 | 37.9 | 117 | 27.6 | 85 | 121 | ◎ | ○ | ○ |
| PRACTICAL EXAMPLE | 9 | C | 33.1 | 32.5 | 35.2 | 108 | 32.5 | 100 | 119 | ◎ | ○ | ○ |
| PRACTICAL EXAMPLE | 10 | C | 37.5 | 32.5 | 41.5 | 128 | 32.0 | 98 | 139 | ○ | ○ | ○ |
| PRACTICAL EXAMPLE | 11 | C | 33.3 | 32.5 | 34.4 | 106 | 26.0 | 80 | 105 | ○ | ○ | ○ |
| PRACTICAL EXAMPLE | 12 | C | 30.0 | 32.5 | 41.2 | 127 | 26.5 | 82 | 108 | ○ | ○ | ○ |
| COMPARATIVE EXAMPLE | 13 | NO CONTROL | 32.1 | 32.5 | 32.5 | 100 | 32.5 | 100 | 86 | × | × | OVERLAP |
| COMPARATIVE EXAMPLE | 14 | C | 30.7 | 32.5 | 28.6 | 88 | 32.5 | 100 | 83 | × | × | OVERLAP |
| COMPARATIVE EXAMPLE | 15 | C | 34.2 | 32.5 | 30.6 | 94 | 36.4 | 112 | 92 | ○ | × | UNDERCUT |

HORIZONTAL FILLET WELDING METHOD, HORIZONTAL FILLET WELDING SYSTEM, AND PROGRAM

TECHNICAL FIELD

The present invention relates to horizontal fillet welding methods, horizontal fillet welding systems, and programs.

BACKGROUND ART

When performing horizontal fillet welding on a medium-thickness or thick plate (referred to as "medium-to-thick plate" hereinafter) by using a consumable-electrode arc welding method, it is demanded that the leg length be large (referred to as "large leg length" hereinafter) and that a wide bead be ensured. In order to ensure a large leg length and a wide bead, it is necessary to increase the amount of weld deposition per unit weld length by, for example, increasing the welding current or reducing the welding rate. However, if the amount of weld deposition is to be increased by fixing the welding current and reducing the welding rate, the production efficiency decreases, and appropriate weld penetration may be not obtained. If the amount of weld deposition is to be increased by fixing the welding current and increasing the welding rate, the temperature of a molten pool may increase, sometimes resulting in reduced viscosity. In this case, the increased amount of weld deposition and the reduced viscosity of the molten pool cause the molten pool at a standing plate side to drip toward a bottom plate due to the effect of gravitational force, sometimes resulting in inferior bead appearance, such as the leg lengths at the standing plate side and the bottom plate side being different from target leg lengths, or welding defects, such as an overlap in which the edges of the bead are simply overlapped with a base material instead of being welded thereto. Normally, fillet welding refers to triangular welding that involves welding two substantially-orthogonal surfaces at, for example, a lap joint, a T-shaped joint, or a corner joint, and horizontal fillet welding refers to fillet welding performed in a downward-facing horizontal orientation.

In order to increase the production efficiency, welding is normally performed at a high welding rate. In order to maintain the amount of weld deposition per unit weld length as the welding rate increases, the welding current has to be increased. However, because the arc force applied to the molten pool increases as the welding current increases, the molten pool directly below the arc is pushed rearward. Thus, a groove formed by the arc at the standing plate side is not supplied with molten metal and thus remains as a groove so that an undercut may form, or the shape of the solidified bead may sometimes have inferior protruding appearance.

Accordingly, the large leg length and the high welding rate in fillet welding are problematic in that inferior bead appearance and welding defects, such as undercuts and overlaps, may occur.

Normally, a method used for solving such problems involves setting the arc voltage to a high value and reducing the arc force by increasing the arc length so as to improve the bead appearance. For example, Patent Literature 1 discloses a technology for improving weld penetration into a groove wall by reducing the welding current at both weaving edges to an electric current value at which an undercut does not occur and increasing the welding rate by increasing the electric current at an intermediate weaving portion, or by increasing the welding current at both weaving edges.

The term "weaving" in this case refers to an operation for oscillating the distal end of a welding torch with reference to a welding line of the base material as the center. FIG. 12 illustrates an example of a conventional weaving operation in horizontal fillet welding. In the example shown in FIG. 12, the bottom plate is disposed horizontally, and an end surface of the standing plate is disposed on the upper surface of the bottom plate. Fillet welding is performed on the junction at which the standing plate and the bottom plate meet (an abutment angle a at the junction is 90 degrees in the example in FIG. 12). As shown in the drawing, in the conventional weaving operation, welding is performed by causing an electrode provided at the distal end of a welding torch 101 to advance while alternately moving the electrode in directions substantially orthogonal to the welding travel direction. Accordingly, in the conventional weaving operation, the welding torch 101 repeatedly moves toward the standing-plate-side weaving edge and the bottom-plate-side weaving edge so as to constantly oscillate forward in the welding travel direction.

CITATION LIST

Patent Literature

PTL 1: Japanese Unexamined Patent Application Publication No. 2002-321055

SUMMARY OF INVENTION

Technical Problem

If the arc voltage is set to a high value for improving the bead appearance, welding defects caused by poor weld penetration or deteriorated shielding performance occur. Furthermore, even if the welding current is adjusted at both weaving edges, it is necessary to increase the amount of weld deposition in a case where horizontal fillet welding is to be performed with a large leg length and at a high rate on a medium-to-thick plate. Thus, welding defects, such as an overlap at the bottom plate side and an undercut at the standing plate side, caused by the molten metal at the standing plate side dripping toward the bottom plate due to the effect of gravitational force are not necessarily suppressed.

An object of the present invention is to suppress the occurrence of inferior bead appearance and welding defects in horizontal fillet welding.

Solution to Problem

In order to achieve the aforementioned object, the present invention provides a horizontal fillet welding method for performing welding along a welding line by using a junction at which a standing plate and a bottom plate meet as the welding line and causing an electrode to perform a weaving operation with reference to the welding line as a center. The horizontal fillet, welding method includes performing control such that an arc voltage at a standing-plate-side weaving edge is lower than or equal to an are voltage at a welding-line center position, an arc voltage at a bottom-plate-side weaving edge is higher than or equal to the arc voltage at the welding-line center position, and the arc voltage at the standing-plate-side weaving edge is lower than the arc voltage at the bottom-plate-side weaving edge.

The arc voltage at the standing-plate-side weaving edge may be a value within a range between 85% and 100% inclusive relative to the arc voltage at the welding-line center position, and the arc voltage at the bottom-plate-side weaving edge may be a value within a range between 100% and 125% inclusive relative to the arc voltage at the welding-line center position.

Furthermore, an arc voltage when the electrode moves at the standing plate side and the bottom plate side may change in any one of three manners including a linear manner, a stepwise manner, and a curved manner or in a combination of two or more manners of the three manners in synchronization with the weaving operation.

Moreover, when a distance between a position of the electrode and the standing-plate-side weaving edge during the weaving operation is within a range of ¼ of a distance between the standing-plate-side weaving edge and the welding-line center position, the arc voltage may be controlled to a value within a predetermined range as a voltage at the standing-plate-side weaving edge, and when a distance between the position of the electrode and the bottom-plate-side weaving edge is within a range of ¼ of a distance between the bottom-plate-side weaving edge and the welding-line center position, the arc voltage may be controlled to a value within a predetermined range as a voltage at the bottom-plate-side weaving edge.

The present invention also provides a horizontal fillet welding method for performing welding along a welding line by using a junction at which a standing plate and a bottom plate meet as the welding line and causing an electrode to perform a weaving operation with reference to the welding line as a center. The horizontal fillet welding method includes controlling an arc voltage at a standing-plate-side weaving edge to a voltage that suppresses an undercut, and controlling an arc voltage at a bottom-plate-side weaving edge to a voltage that suppresses an overlap.

Furthermore, the present invention also provides a horizontal fillet welding system including: a horizontal fillet welding device that performs welding along a welding line by using a junction at which a standing plate and a bottom plate meet as the welding line and causing an electrode to perform a weaving operation with reference to the welding line as a center; and a control device that, controls the horizontal fillet welding device such that an arc voltage at a standing-plate-side weaving edge is lower than or equal to an arc voltage at a welding-line center position, an arc voltage at a bottom-plate-side weaving edge is higher than or equal to the arc voltage at the welding-line center position, and the arc voltage at the standing-plate-side weaving edge is lower than the arc voltage at the bottom-plate-side weaving edge.

The present invention also provides a horizontal fillet welding system that performs welding along a welding line by using a junction at which a standing plate and a bottom plate meet as the welding line and causing an electrode to perform a weaving operation with reference to the welding line as a center. The horizontal fillet welding system includes: weaving-position commanding means that commands a position where the electrode is to perform a weaving operation based on teaching data in which a welding condition is set; position-information generating means that generates position information of the electrode that has moved in accordance with a command of the weaving-position commanding means; and arc-voltage controlling means that performs voltage control in synchronization with the weaving operation of the electrode based on the position information generated by the position-information generating means and that performs control such that an arc voltage at a standing-plate-side weaving edge is lower than or equal to an arc voltage at a welding-line center position, an arc voltage at a bottom-plate-side weaving edge is higher than or equal to the arc voltage at the welding-line center position, and the arc voltage at the standing-plate-side weaving edge is lower than the arc voltage at the bottom-plate-side weaving edge.

The position-information generating means may generate information indicating an actual position of the electrode, as the position information of the electrode, based on the command of the weaving-position commanding means and a time period from when the command is performed to when the electrode actually reaches a commanded position.

The present invention also provides a program used in a horizontal fillet welding system that performs welding along a welding line by using a junction at which a standing plate and a bottom plate meet as the welding line and causing an electrode to perform a weaving operation with reference to the welding line as a center. The program causes the horizontal fillet welding system to realize a function of performing control such that an arc voltage at a standing-plate-side weaving edge is lower than or equal to an arc voltage at a welding-line center position, an arc voltage at a bottom-plate-side weaving edge is higher than or equal to the arc voltage at the welding-line center position, and the arc voltage at the standing-plate-side weaving edge is lower than the arc voltage at the bottom-plate-side weaving edge.

Advantageous Effects of Invention

According to the present invention, the occurrence of inferior bead appearance and welding defects in horizontal fillet welding can be suppressed.

BRIEF DESCRIPTION OF DRAWINGS

FIG. 9 illustrates test results obtained in practical examples and comparative examples.

DESCRIPTION OF EMBODIMENTS

An embodiment of the present invention will be described in detail below with reference to the appended drawings.

<System Configuration>

Figure 1:
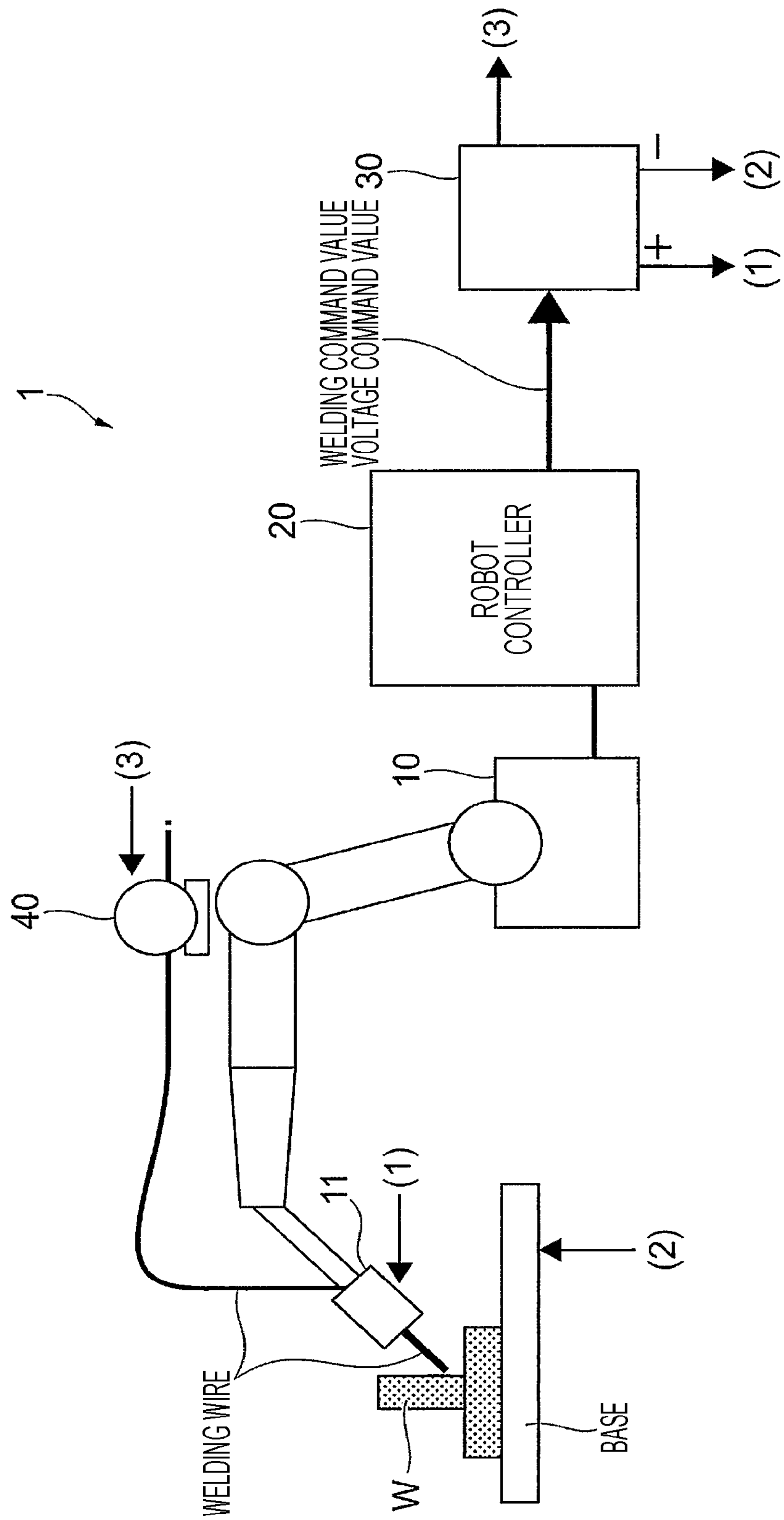
FIG. 1 illustrates an example of a schematic configuration of a welding system according to an embodiment.

First, a welding system 1 according to this embodiment will be described. FIG. 1 illustrates an example of a schematic configuration of the welding system 1 according to this embodiment.

As shown in FIG. 1, the welding system 1 according to this embodiment includes a welding robot 10, a robot controller 20, a welding power supply 30, and a feeding device 40. The welding power supply 30 is connected to an electrode via a positive power cable (1) and is also connected to a workpiece W via a negative power cable (2). In the drawing, a power cable (3) connects the welding power supply 30 and the feeding device 40 for a welding wire and controls the feed rate of the welding wire. By using an arbitrary position near the junction at which a standing plate and a bottom plate meet in a T shape as a welding line, the welding system 1 performs horizontal fillet welding along the welding line. The range near the junction is, for example, 30 mm toward the bottom plate and 30 mm toward the standing plate from the junction. In this embodiment, the welding robot 10 is used as an example of a horizontal fillet welding device. Furthermore, the robot controller 20 is used as an example of a control device.

The welding robot 10 releases arc from the electrode and uses the heat thereof to weld the workpiece W (i.e., a base material, namely, the standing plate and the bottom plate) serving as a welding target. The welding robot 10 has a welding torch 11 that supports the electrode. The welding robot 10 causes the electrode provided at the distal end of the welding torch 11 to perform a weaving operation with reference to the welding line as the center, so as to perform welding along the welding line (i.e., in the welding travel direction).

The distal end of the welding torch 11 supports a welding material (referred to as "welding wire" hereinafter) serving as an electrode and protruding by a fixed length from the distal end of a cylindrical conductor called a contact tip. A welding method used in this embodiment is a consumable electrode method that involves melting the welding wire by bringing the contact tip and the welding wire into contact with each other and applying an arc voltage thereto so as to generate arc between the workpiece W and the distal end of the welding wire. The protruding length of the electrode during the welding process is preferably 40 mm at maximum and 15 mm at minimum. If the protruding length exceeds 40 mm, sufficient, weld penetration may be not, obtained along the welding line, or a possibility of the occurrence of welding defects caused by deteriorated shielding performance may increase. If the protruding length is below 15 mm, the welding current increases, which tends to cause a welding defect to occur at a weaving edge.

Furthermore, the welding torch 11 includes a shield gas nozzle (i.e., a mechanism that discharges shield gas). Examples of the shield gas that may be used include 100% $CO_2$, 100% Ar, and Ar mixed with $CO_2$. In particular, it is preferable to use 100% $CO_2$ due to its high weld penetration effect. In view of preventing shield gas degradation, it is preferable that the upper limit of the gas flow be 40 liters per minute and the lower limit be 15 liters per minute.

The robot controller 20 controls the operation of the welding robot 10. The robot controller 20 preliminarily retains teaching data containing an operational pattern, a welding start position, a welding end position, and welding conditions of the welding robot 10, and controls the operation of the welding robot 10 by indicating the teaching data to the welding robot 10. Furthermore, during the welding process, the robot controller 20 commands the welding power supply 30 to control the electric power in accordance with the teaching data.

The welding power supply 30 supplies electric power to the electrode and the workpiece W in response to the command from the robot controller 20 so as to generate arc between the electrode and the workpiece W. Moreover, the welding power supply 30 supplies electric power to the feeding device 40 in response to the command from the robot controller 20. The electric current during the welding process may be direct current or alternating current, and the waveform thereof is not particularly limited and may be, for example, rectangular wave or triangular wave pulses.

The feeding device 40 feeds the welding wire to the welding torch 11 as the welding process progresses. The welding wire fed by the feeding device 40 is not particularly limited and is selected in accordance with the properties and the weldability of the workpiece W. For example, a solid wire or a flux-cored wire is used. Moreover, the material of the welding wire is not limited. For example, soft steel, stainless steel, aluminum, or titanium may be used. Furthermore, the diameter of the welding wire is not particularly limited. In this embodiment, the diameter is preferably 16 mm at maximum and 1.0 mm at minimum.

Figure 2:
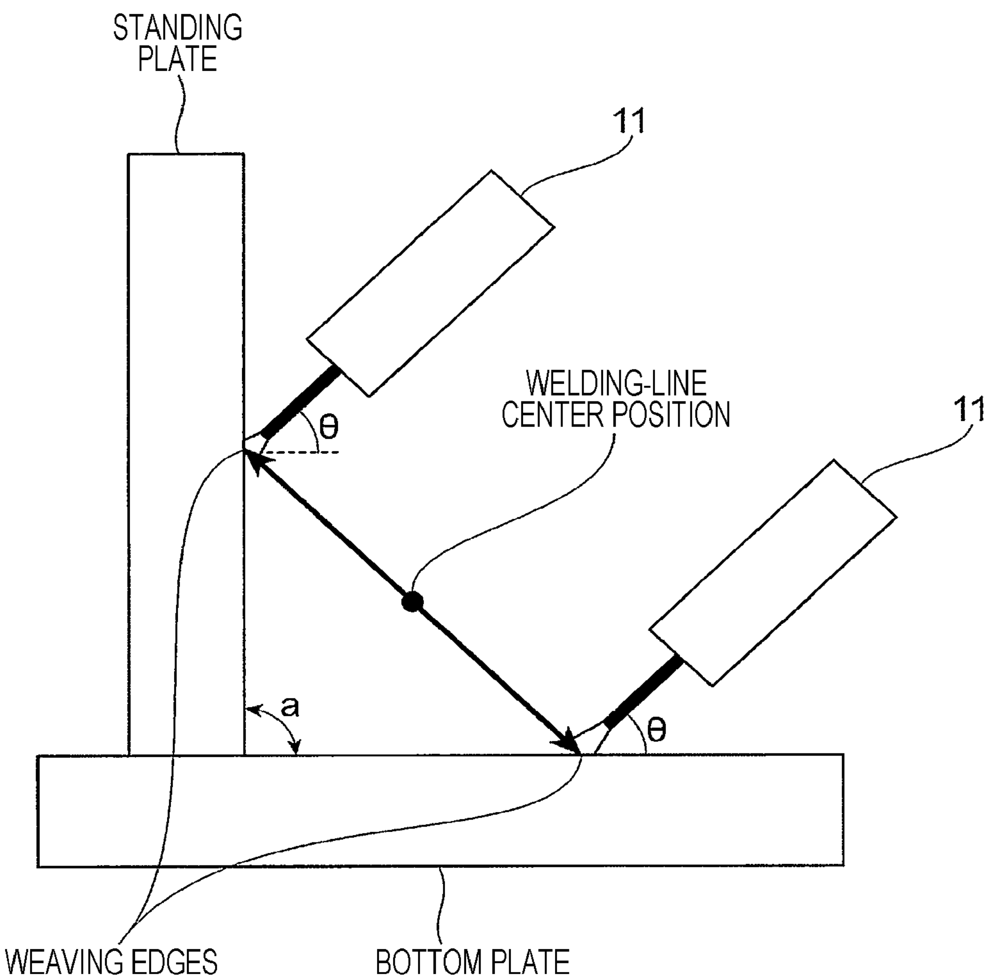
FIG. 2 schematically illustrates a horizontal fillet welding process according to this embodiment, as viewed from a welding travel direction.

FIG. 2 schematically illustrates a horizontal fillet welding process according to this embodiment, as viewed from the welding travel direction. As shown in the drawing, the bottom plate is disposed horizontally, and an end surface of the standing plate is disposed on the upper surface of the bottom plate. Fillet welding is performed on the junction at which the standing plate and the bottom plate meet (an abutment angle a at the junction is 90 degrees in the example in FIG. 2). The welding process progresses in the direction perpendicular to the plane of the drawing. The welding torch 11 performs weaving alternately in directions indicated by arrows, that is, in a direction extending toward the bottom plate and in a direction extending toward the standing plate, as in the conventional weaving operation shown in FIG. 12. Furthermore, the welding process is performed by tilting the welding torch 11 such that an angle formed between the bottom plate and the electrode (referred to as "torch tilt angle θ" hereinafter) is, for example, 45 degrees. Moreover, a welding-line center position indicates a position on the welding line between a bottom-plate-side weaving edge and a standing-plate-side weaving edge.

Figure 12:
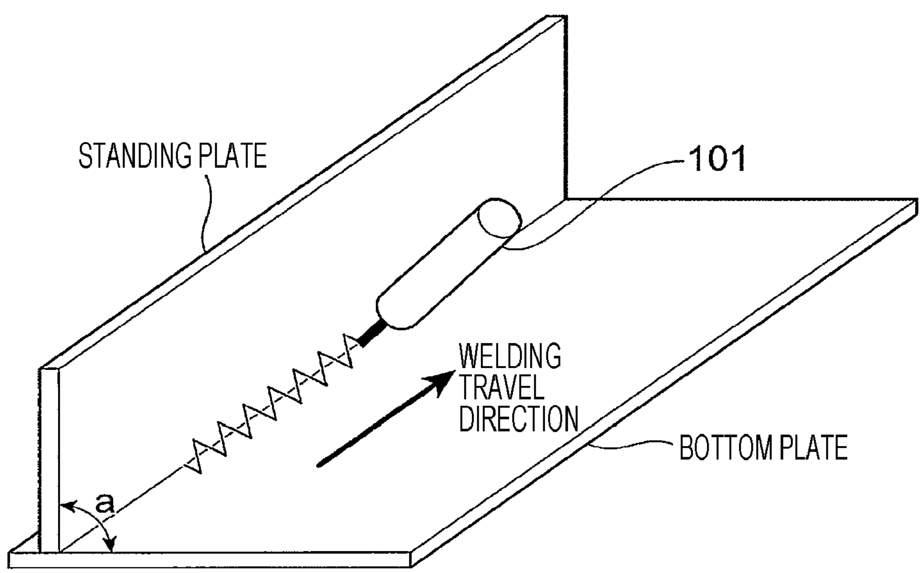
FIG. 12 illustrates an example of a conventional weaving operation in horizontal fillet welding.

Although it is described in this embodiment that the electrode operates as in the conventional weaving operation shown in FIG. 12, the weaving operation of the electrode is not limited to such a configuration. The electrode may operate in any manner so long as the weaving operation is performed such that the electrode moves alternately toward the standing plate and toward the bottom plate in the horizontal fillet welding process. For example, the weaving operation may be performed such that, when the electrode moves forward in the welding travel direction to the bottom-plate-side weaving edge and reaches the bottom-plate-side weaving edge, the electrode moves rearward against the welding travel direction to the standing-plate-side weaving edge.

<Functional Configuration of Robot Controller>

Figure 3:
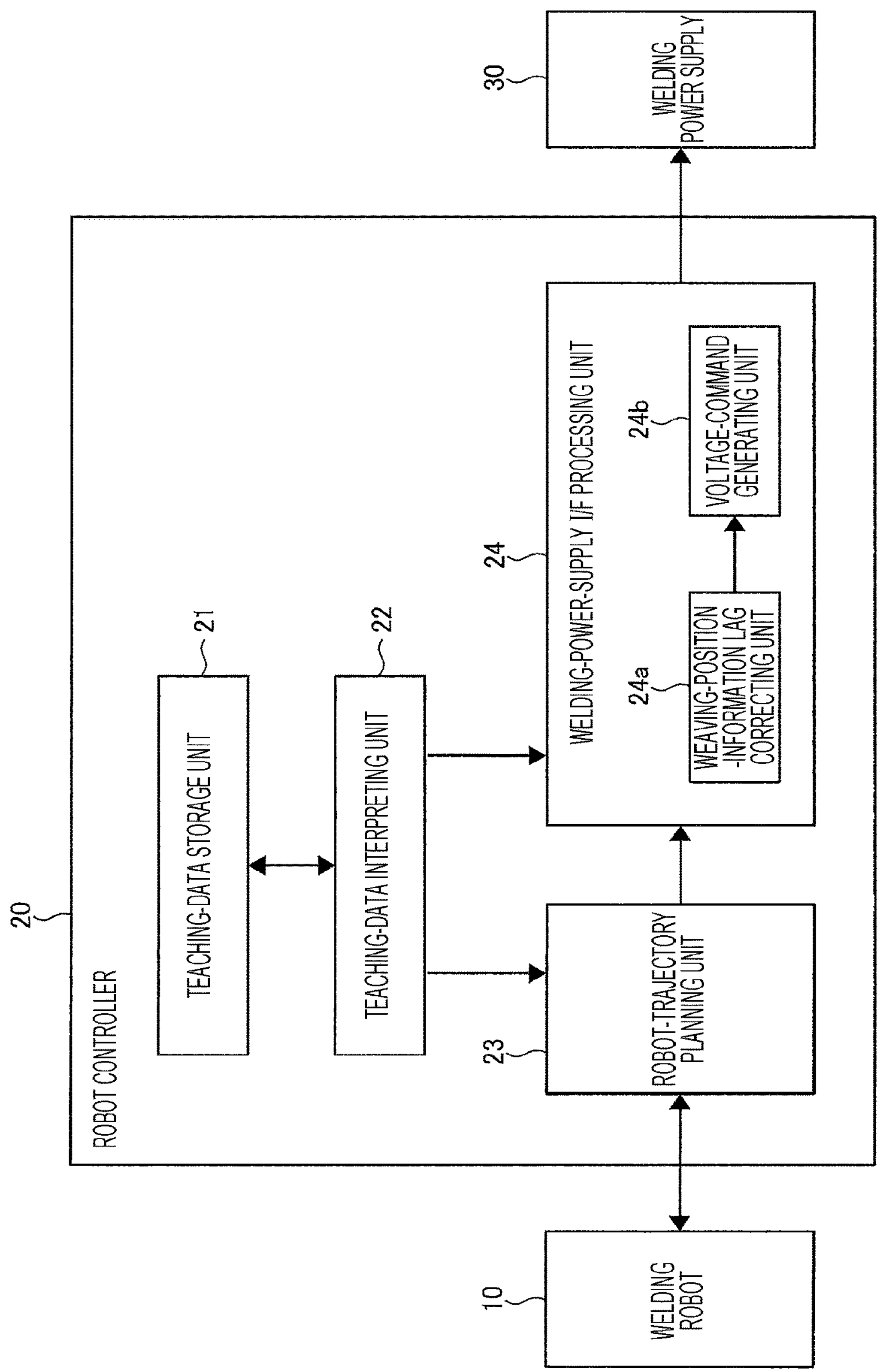
FIG. 3 is a block diagram illustrating a functional configuration example of a robot controller according to this embodiment.

Next, a functional configuration of the robot controller 20 will be described. FIG. 3 is a block diagram illustrating a functional configuration example of the robot controller 20 according to this embodiment.

As shown in FIG. 3, the robot controller 20 includes a teaching-data storage unit 21 that stores preliminarily-created teaching data, a teaching-data interpreting unit 22 that interprets the teaching data, a robot-trajectory planning unit 23 that generates servo command information for commanding a servo driver to control the axes of the welding robot 10, and a welding-power-supply interface processing unit (referred to as "welding-power-supply I/F processing unit" hereinafter) 24 that generates command information for setting an arc voltage in accordance with the position of the electrode and outputs the command information to the welding power supply 30.

The welding-power-supply I/F processing unit 24 has a weaving-position-information lag correcting unit 24*a* and a voltage-command generating unit 24*b*.

The teaching-data storage unit, 21 stores teaching data in which, for example, the operational pattern of the welding robot 10 is set. The teaching data is preliminarily created by an operator.

For example, when a welding start operation is performed, the teaching-data interpreting unit 22 retrieves the teaching data from the teaching-data storage unit 21 and interprets the teaching data. As a result of this interpretation of the teaching data, teaching trajectory information and voltage command information are generated. In the teaching trajectory information, the trajectory of the welding robot 10 in the welding process is set. The voltage command information is used for performing a command related to an arc voltage in the welding process, and includes an arc on/off command and an arc-voltage control command. The teaching-data interpreting unit 22 outputs the generated teaching trajectory information to the robot-trajectory planning unit 23. Moreover, the teaching-data interpreting unit 22 outputs the generated voltage command information to the voltage-command generating unit 24*b* of the welding-power supply I/F processing unit 24.

Based on the teaching trajectory information input from the teaching-data interpreting unit 22, the robot-trajectory planning unit 23 calculates a target position of the welding robot 10 and generates servo command information for controlling the axes of the welding robot 10. Then, the robot-trajectory planning unit 23 outputs the generated servo command information to the welding robot 10. In response to the servo command information, the welding robot 10 performs an operation based on the teaching data.

The servo command information also contains weaving-position command information for commanding a position where the electrode is to perform a weaving operation. The robot-trajectory planning unit 23 outputs the weaving-position command information to the weaving-position-information lag correcting unit 24*a* of the welding-power-supply I/F processing unit 24. In this embodiment, the robot-trajectory planning unit 23 is used as an example of weaving-position commanding means.

Furthermore, the robot-trajectory planning unit 23 calculates the time (referred to as "weaving lag time" hereinafter) it takes for the servo command information output from the welding robot 10 to actually reach the position designated by the welding robot 10. Although a method of calculating this weaving lag time is not limited, for example, the weaving lag time is calculated from the control gain of the servo driver. Then, the robot-trajectory planning unit 23 outputs the calculated weaving lag time to the weaving-position-information lag correcting unit 24*a* of the welding-power-supply I/F processing unit 24.

The welding-power-supply I/F processing unit 24 generates command information for setting an arc voltage in accordance with the position of the electrode and outputs the generated command information to the welding power supply 30.

The weaving-position-information lag correcting unit 24*a* of the welding-power-supply I/F processing unit 24 acquires the weaving-position command information and the information about the weaving lag time from the robot-trajectory planning unit 23. Then, the weaving-position-information lag correcting unit 24*a* corrects the position of the electrode in the weaving operation in view of the weaving lag time and generates information indicating the actual position of the electrode (referred to as "actual-weaving-position information" hereinafter). The weaving-position-information lag correcting unit 24*a* outputs the generated actual-weaving-position information to the voltage-command generating unit 24*b*. In this embodiment, the weaving-position-information lag correcting unit 24*a* is used as an example of position-information generating means.

The voltage-command generating unit 24*b* acquires the voltage command information from the teaching-data interpreting unit 22 and also acquires the actual-weaving-position information from the weaving-position-information lag correcting unit 24*a*. Then, based on the acquired voltage command information and the acquired actual-weaving-position information, the voltage-command generating unit 24*b* generates command information for setting the arc voltage in synchronization with the weaving operation of the electrode, and outputs the generated command information to the welding power supply 30. In response to the arc-voltage command information, the welding power supply 30 supplies the arc voltage in accordance with the position of the electrode in the weaving operation. In this embodiment, the voltage-command generating unit 24*b* is used as an example of arc-voltage controlling means.

<Arc Voltage>

Next, the arc voltage in this embodiment will be described in detail. As mentioned above, in this embodiment, the arc voltage is controlled in accordance with the position of the electrode in the weaving operation. However, because an increase and decrease in the arc voltage have an effect on the arc force, such an increase and decrease affect the weld penetration depth and the bead shape. In the case of fillet welding, it is preferable that the arc voltage can ensure weld penetration along the welding line and can prevent undercuts and overlaps at the weaving edges. At the standing-plate-side weaving edge, the molten pool is pushed rearward by the arc force, and the molten pool drips toward the bottom plate due to the effect of gravitational force, thus causing an undercut to occur readily. At the bottom-plate-side weaving edge, the molten pool at the standing plate drips and overlaps with the base material without fusing, thus causing an overlap to occur readily.

The arc shape is normally a bell shape and expands from the distal end of the electrode toward the base material. Therefore, the arc at the base material side expands more as the arc voltage increases, that is, as the arc length increases.

Therefore, if the arc voltage is increased at the standing plate side, the base material is cut away by the expanded arc, thus causing an undercut to occur readily. Thus, it is necessary to set the arc voltage at the standing plate side to a low value. At the bottom plate side, the arc voltage is set to a high value so that the molten metal at the bottom plate side is spread out more, thereby suppressing the occurrence of overlaps.

In this embodiment, control is performed such that the arc voltage when the electrode moves toward the standing-plate-side weaving edge (referred to as "standing-plate-side voltage" hereinafter) indicates a value lower than or equal to the arc voltage when the electrode moves toward the welding-line center position (referred to as "welding-line-center voltage" hereinafter), and the arc voltage when the electrode moves toward the bottom-plate-side weaving edge (referred to as "bottom-plate-side voltage" hereinafter) indicates a value higher than or equal to the welding-line-center voltage, and such that the standing-plate-side voltage is lower than the bottom-plate-side voltage (i.e., the bottom-plate-side voltage is higher than the standing-plate-side voltage). In other words, the standing-plate-side voltage is set to a voltage value by which undercuts are suppressed, and the bottom-plate-side voltage is set to a voltage value by which overlaps are suppressed.

Accordingly, in this embodiment, a difference in the magnitude of arc voltage is provided between the standing-plate side and the bottom-plate side, so that welding defects, such as undercuts and overlaps, are further suppressed, thereby achieving favorable bead appearance.

Furthermore, it is preferable that control be performed such that the arc voltage changes in a linear manner, stepwise manner, or curved manner in synchronization with the weaving operation of the electrode.

Figure 4:
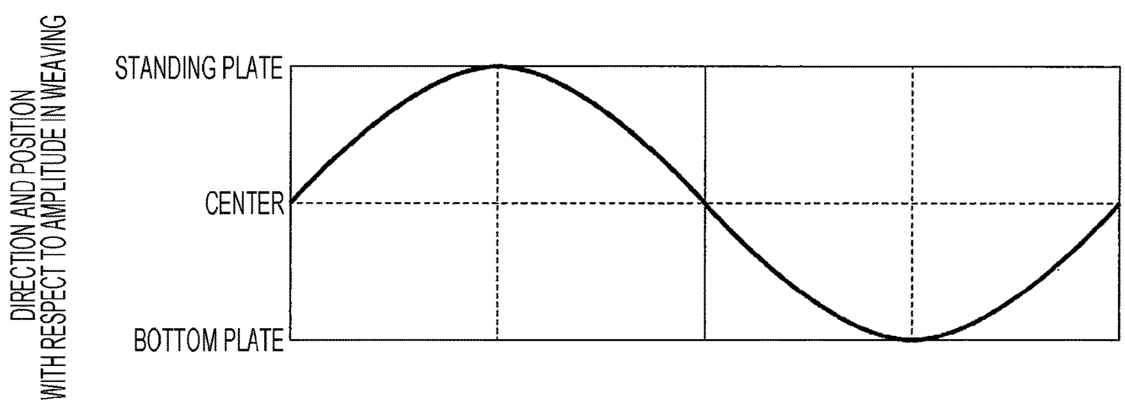
FIG. 4 illustrates an example of the amplitude of an electrode in a weaving operation.
Figure 5A:
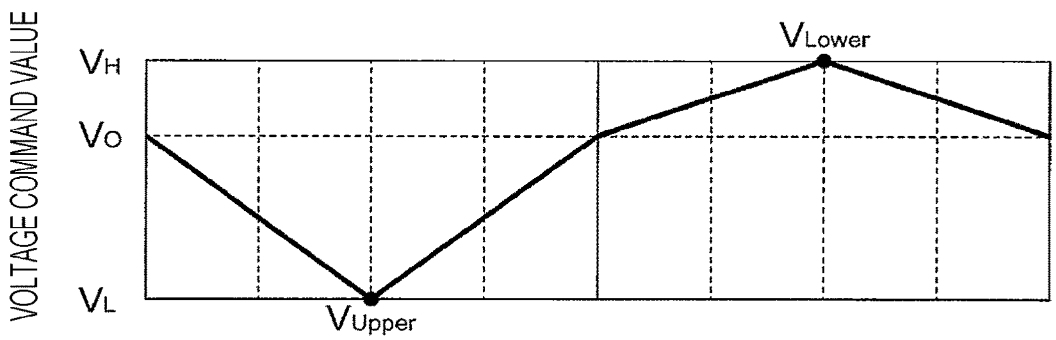
FIG. 5A illustrates an example of an arc voltage controlled in accordance with a weaving trajectory.
Figure 5B:
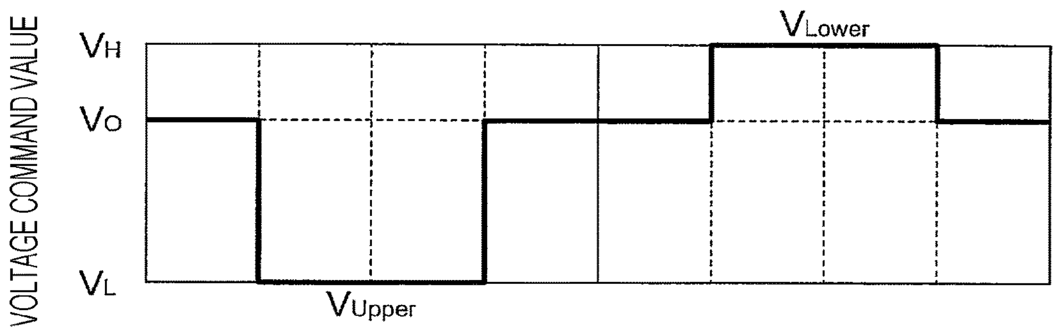
FIG. 5B illustrates an example of an arc voltage controlled in accordance with a weaving trajectory.
Figure 5C:
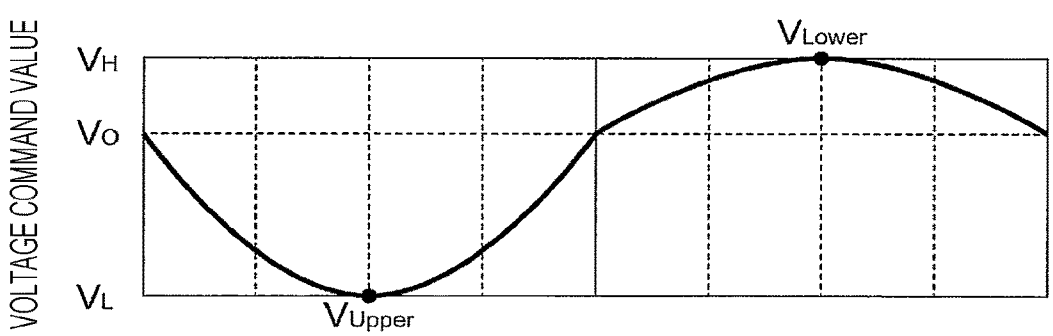
FIG. 5C illustrates an example of an arc voltage controlled in accordance with a weaving trajectory.

FIG. 4 illustrates an example of the amplitude of the electrode in the weaving operation. FIGS. 5A to 5C each illustrate an example of the arc voltage controlled in accordance with a weaving trajectory. In the example shown in FIG. 4, a weaving operation equivalent to one cycle is shown, and the electrode moves toward the standing-plate-side weaving edge and the bottom-plate-side weaving edge.

In the example shown in FIG. 5A, the arc voltage changes linearly in accordance with the weaving trajectory shown in FIG. 4. In this case, $V_H$ denotes the higher voltage, $V_L$ denotes the lower voltage, $V_{Lower}$ denotes the bottom-plate-side voltage, and $V_{Upper}$ denotes the standing-plate-side voltage. If the electrode is located at the standing plate side relative to the welding line, the arc voltage is set to be lower than the welding-line-center voltage ($V_O$). If the electrode is located at the bottom plate side relative to the welding line, the arc voltage is set to be higher than the welding-line-center voltage $V_O$.

In the example shown in FIG. 5B, the arc voltage changes in a stepwise manner in accordance with the weaving trajectory shown in FIG. 4. If the electrode is located at the standing plate side relative to the welding line, the arc voltage is set to be lower than $V_O$. If the electrode is located at the bottom plate side relative to the welding line, the arc voltage is set to be higher than $V_O$. Furthermore, in the example shown in FIG. 5C, the arc voltage changes in a curved manner in accordance with the weaving trajectory shown in FIG. 4. If the electrode is located at the standing plate side relative to the welding line, the arc voltage is set to be lower than $V_O$. If the electrode is located at the bottom plate side relative to the welding line, the arc voltage is set to be higher than $V_O$.

Accordingly, the arc voltage is controlled in a linear manner, stepwise manner, or curved manner in accordance with the weaving trajectory, thereby ensuring favorable bead appearance while ensuring weld penetration along the welding line.

Figure 6:
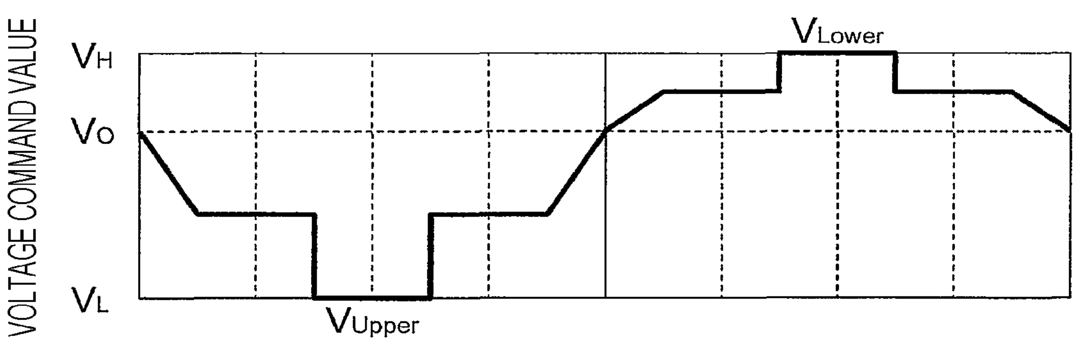
FIG. 6 illustrates an example where control is performed such that the arc voltage changes in a linear and stepwise manner in accordance with a weaving trajectory.

Furthermore, control may be performed such that the arc voltage changes in a combination of two or more manners (e.g., a linear and stepwise manner or a linear and curved manner) of the three manners, namely, the linear manner, stepwise manner, and curved manner. FIG. 6 illustrates an example where control is performed such that the arc voltage changes in a linear and stepwise manner in accordance with the weaving trajectory. In the example shown in FIG. 6, when the electrode first moves from the welding-line center position to the standing-plate-side weaving edge, the arc voltage changes in a linear manner and then changes in a stepwise manner from an intermediate position. When the electrode moves from the welding-line center position to the bottom-plate-side weaving edge after reaching the standing-plate-side weaving edge, the arc voltage changes in a linear manner and then changes in a stepwise manner from an intermediate position.

As mentioned above, it is preferable that the standing-plate-side voltage be lower than the bottom-plate-side voltage. It is more preferable that the standing-plate-side voltage range between 85% and 100% inclusive relative to the arc voltage value at the welding-line center position (i.e., the arc voltage value along the welding line) and that the bottom-plate-side voltage range between 100% and 125% inclusive relative to the arc voltage value at the welding-line center position.

If the standing-plate-side voltage falls below 85% relative to the welding-line-center voltage value, there is a possibility of the occurrence of spatter at the standing-plate-side weaving edge. If the standing-plate-side voltage exceeds 100% relative to the welding-line-center voltage value, the undercut prevention effect is less likely to be exhibited.

If the bottom-plate-side voltage falls below 100% relative to the welding-line-center voltage value, the overlap prevention effect is less likely to be exhibited. If the bottom-plate-side voltage exceeds 125% relative to the welding-line-center voltage value, the arc length becomes excessive, possibly resulting in insufficient weld penetration or insufficient arc.

Furthermore, when the robot controller 20 performs control for increasing or decreasing the arc voltage at a weaving edge position or near a weaving edge, the arc length fluctuates due to the increase or decrease in the arc voltage, possibly causing spatter or welding defects to occur due to unstable arc at the weaving edge position or resulting in poor conformability of the molten metal (e.g., a poor flank angle, which will be described later).

Therefore, it is preferable that control be performed such that the arc voltage at a weaving edge position or near a weaving edge not increase or decrease by a large amount. In other words, when the distance between the electrode position and the standing-plate-side weaving edge during the weaving operation is within ¼ of the distance between the standing-plate-side weaving edge and the welding-line center position, it is preferable that the arc voltage be controlled such that the voltage at the standing-plate-side weaving edge is a value within a predetermined range. Furthermore, when the distance between the electrode position and the bottom-plate-side weaving edge during the weaving operation is within ¼ of the distance between the bottom-plate-side weaving edge and the welding-line center position, it is preferable that the arc voltage be controlled such that the voltage at the bottom-plate-side weaving edge is a value within a predetermined range.

In detail, the value within the predetermined range as the voltage at the standing-plate-side weaving edge ranges between 85% and 100% inclusive relative to the welding-line-center voltage value and is set as, for example, a value within the range between 90% and 95% inclusive relative to the welding-line-center voltage value. Furthermore, for example, the value may be set as a fixed value, such as a value of 92% relative to the welding-line-center voltage value.

Likewise, the value within the predetermined range as the voltage at the bottom-plate-side weaving edge ranges between 100% and 125% inclusive relative to the welding-line-center voltage value and is set as, for example, a value within the range between 115% and 120% inclusive relative to the welding-line-center voltage value. Furthermore, for example, the value may be set as a fixed value, such as a value of 118% relative to the welding-line-center voltage value.

Figure 7A:
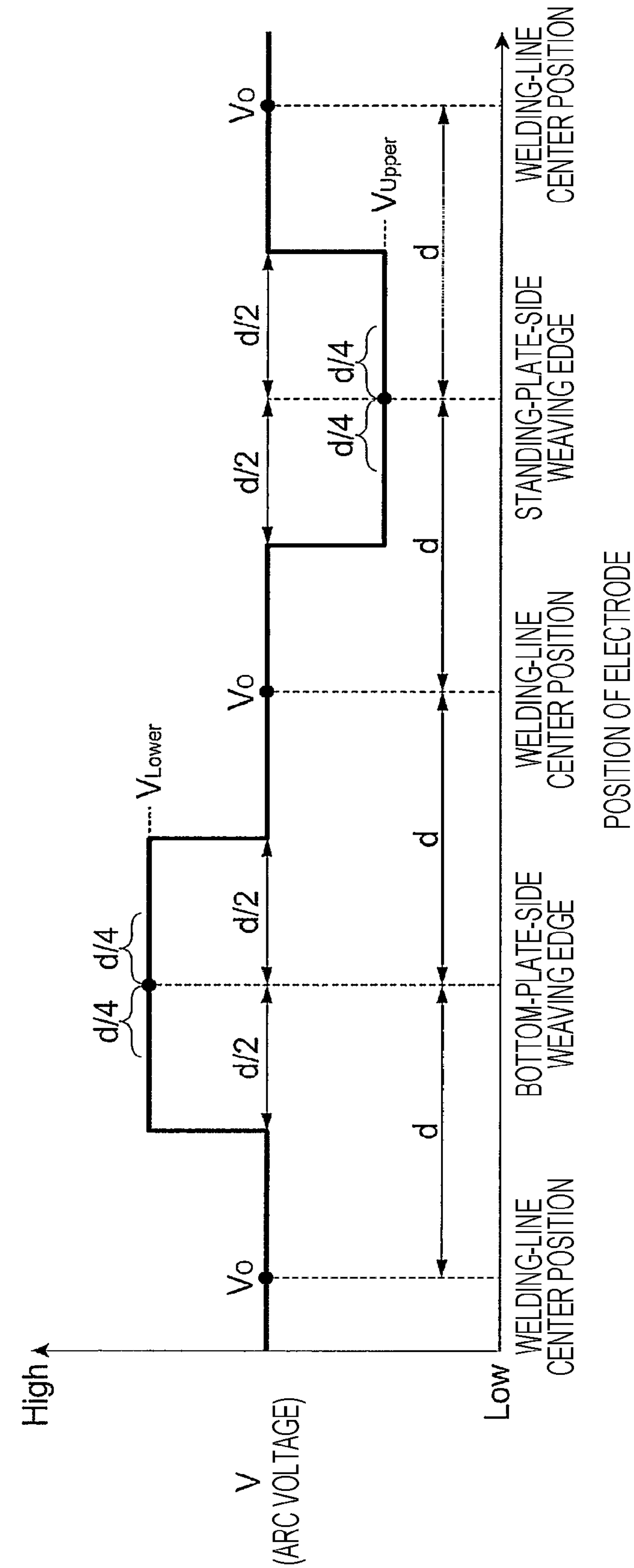
FIG. 7A illustrates an example of a waveform pattern classified in accordance with the arc voltage near weaving edges.
Figure 7B:
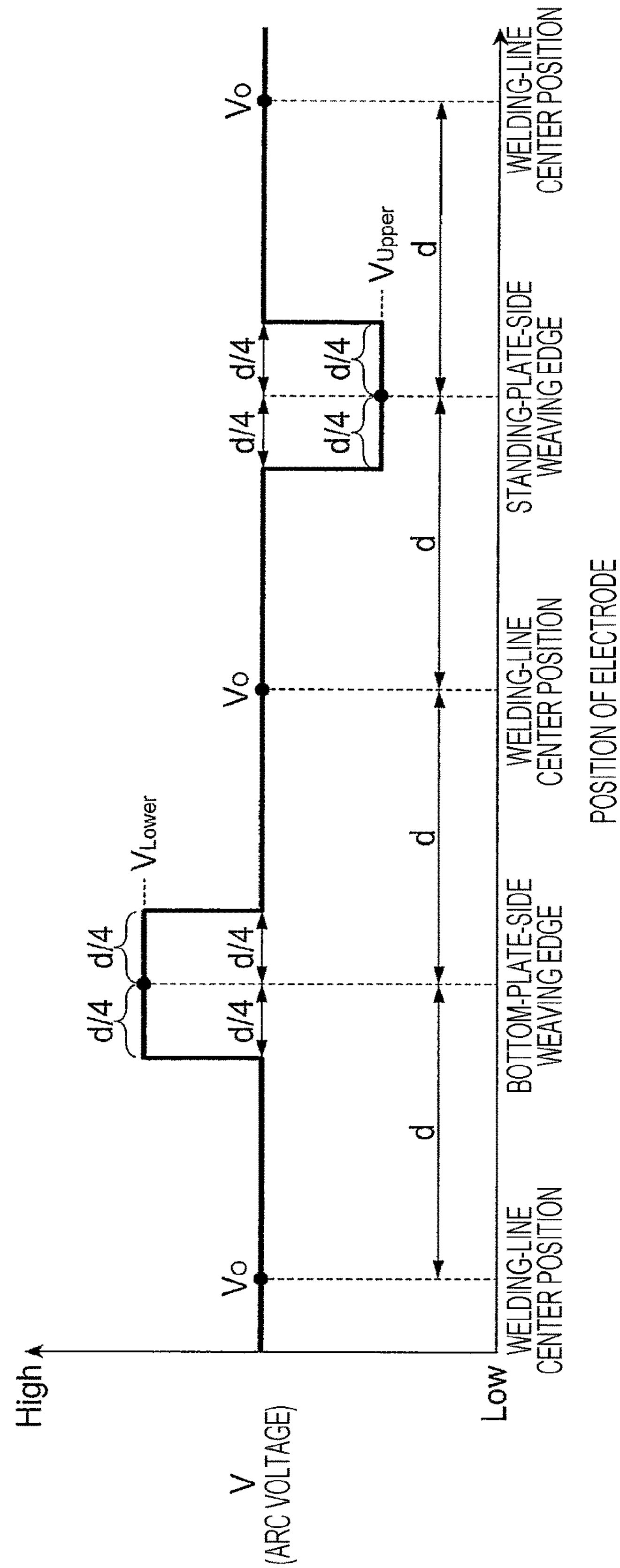
FIG. 7B illustrates an example of a waveform pattern classified in accordance with the arc voltage near the weaving edges.
Figure 7C:
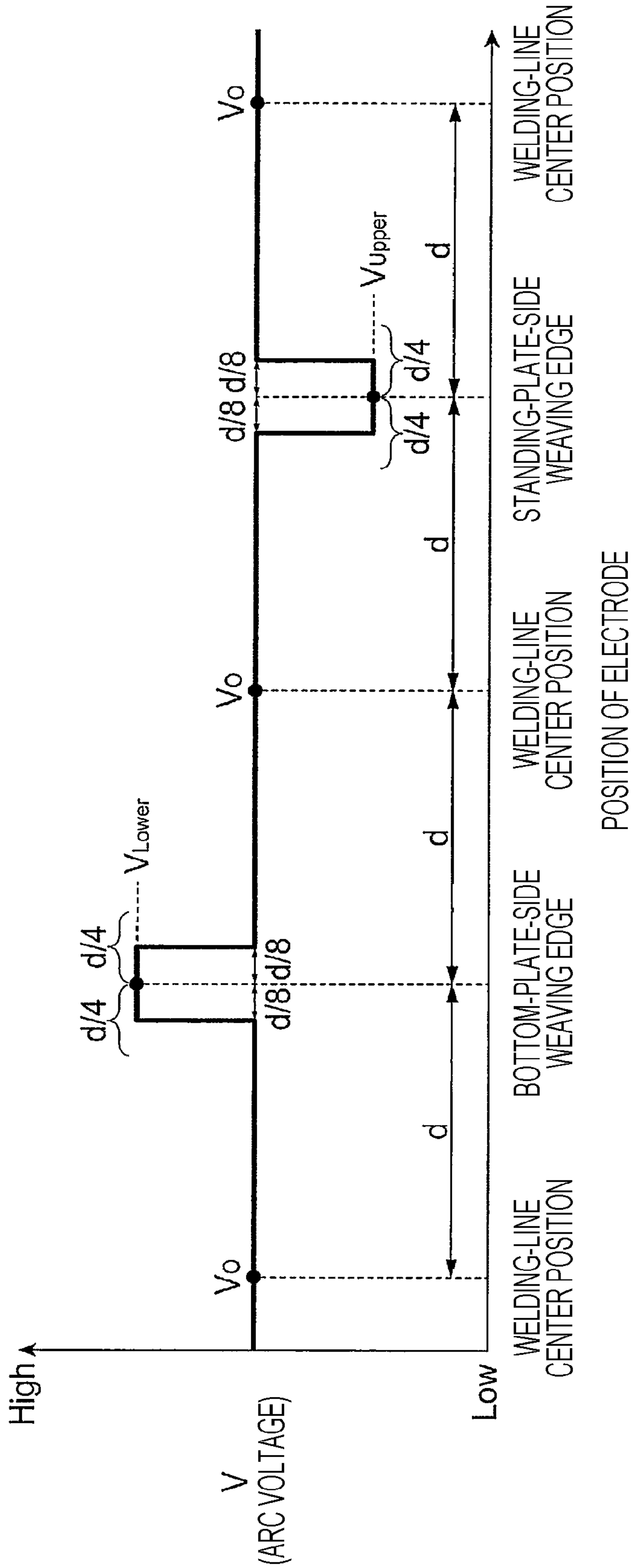
FIG. 7C illustrates an example of a waveform pattern classified in accordance with the arc voltage near the weaving edges.

FIGS. 7A to 7C illustrate examples of waveform patterns classified in accordance with the arc voltage near the weaving edges. Although the arc voltage changes in a stepwise manner in each of the examples shown in FIGS. 7A to 7C, it is assumed that the waveform patterns are classified similarly in a case where, for example, the arc voltage changes in a linear manner or a curved manner.

Although the arc voltage changes in a stepwise manner in accordance with the weaving trajectory in each of the examples shown in FIGS. 7A to 7C, control is performed such that the arc voltage is a value within a predetermined range near a weaving edge. The arc voltage is controlled to a fixed voltage $V_{Upper}$ near the standing-plate-side weaving edge (i.e., the value within the predetermined range as the voltage at the standing-plate-side weaving edge is controlled to $V_{Upper}$), and the arc voltage is controlled to a fixed voltage $V_{Lower}$ near the bottom-plate-side weaving edge (i.e., the value within the predetermined range as the voltage at the bottom-plate-side weaving edge is controlled to $V_{Lower}$).

Assuming that the distance between the standing-plate-side weaving edge and the welding-line center position is defined as d (the distance between the bottom-plate-side weaving edge and the welding-line center position is also defined as d), if the distance between the electrode position and the bottom-plate-side weaving edge is within the range of d/2 in the example shown in FIG. 7A, the arc voltage is controlled to $V_{Lower}$. If the distance between the electrode position and the standing-plate-side weaving edge is within the range of d/2, the arc voltage is controlled to $V_{Upper}$. If the distance between the electrode position and the bottom-plate-side weaving edge is within the range of d/4 in the example shown in FIG. 7B, the arc voltage is controlled to $V_{Lower}$. If the distance between the electrode position and the standing-plate-side weaving edge is within the range of d/4, the arc voltage is controlled to $V_{Upper}$.

Specifically, when the electrode position is within the range of d/4 from each weaving edge, the arc voltage is controlled to a value within a predetermined range, and more preferable control for suppressing, for example, the occurrence of spatter or welding defects as well as poor conformability of the molten metal is performed as control of the arc voltage at a weaving edge position and near a weaving edge.

If the distance between the electrode position and the bottom-plate-side weaving edge is within the range of d/8 in the example shown in FIG. 7C, the arc voltage is controlled to $V_{Lower}$. However, when the distance between the electrode position and the bottom-plate-side weaving edge exceeds d/8, the arc voltage is controlled to be lower than $V_{Lower}$. If the distance between the electrode position and the standing-plate-side weaving edge is within the range of d/8, the arc voltage is controlled to $V_{Upper}$. However, when the distance between the electrode position and the bottom-plate-side weaving edge exceeds d/8, the arc voltage is controlled to be higher than $V_{Upper}$.

Therefore, unlike the examples shown in FIGS. 7A and 7B, more preferable control is not performed in the example shown in FIG. 7C as control of the arc voltage at a weaving edge position and near a weaving edge.

<Arc-Voltage Control Procedure>

Figure 8:
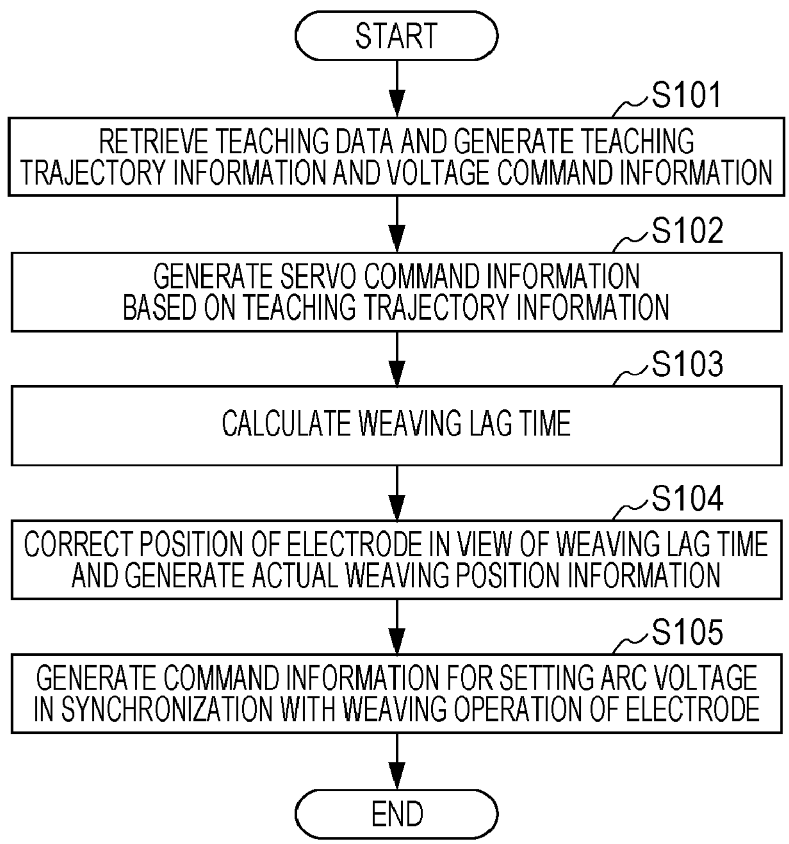
FIG. 8 is a flowchart illustrating an example of a procedure performed by the robot controller for controlling the arc voltage.

Next, a procedure performed by the robot controller 20 for controlling the arc voltage will be described. FIG. 8 is a flowchart illustrating an example of the procedure performed by the robot controller 20 for controlling the arc voltage.

First, when the operator performs an operation for starting a welding process, the teaching-data interpreting unit 22 retrieves teaching data from the teaching-data storage unit 21 and interprets the teaching data so as to generate teaching trajectory information and voltage command information (step 101). The generated teaching trajectory information is output to the robot-trajectory planning unit 23, and the voltage command information is output to the voltage-command generating unit 24*b* of the welding-power-supply I/F processing unit 24.

Subsequently, the robot-trajectory planning unit 23 calculates a target position of the welding robot 10 based on the teaching trajectory information input from the teaching-data interpreting unit 22 so as to generate servo command information (step 102). Then, the robot-trajectory planning unit 23 outputs the generated servo command information to the welding robot 10 and outputs weaving-position command information to the weaving-position-information lag correcting unit 24*a* of the welding-power-supply I/F processing unit 24.

Furthermore, the robot-trajectory planning unit 23 calculates the weaving lag time (step 103) and outputs the information about the calculated weaving lag time to the weaving-position-information lag correcting unit 24*a* of the welding-power-supply I/F processing unit 24.

Subsequently, the weaving-position-information lag correcting unit 24*a* acquires the weaving-position command information and the information about the weaving lag time from the robot-trajectory planning unit 23 and corrects the position of the electrode in the weaving operation in view of the weaving lag time so as to generate actual-weaving-position information (step 104). The generated actual-weaving-position information is output to the voltage-command generating unit 24*b* of the welding-power-supply I/F processing unit 24.

Subsequently, the voltage-command generating unit 24*b* acquires the voltage command information from the teaching-data interpreting unit 22, acquires the actual-weaving-position information from the weaving-position-information lag correcting unit 24*a*, and generates command information for setting the arc voltage in synchronization with the weaving operation of the electrode (step 105). The generated command information is output to the welding power supply 30. Based on this command information, the welding power supply 30 supplies the arc voltage in accordance with the position of the electrode in the weaving operation. Then, the flow of this process ends.

<Practical Examples>

Next, practical examples of the present invention will be described in comparison with comparative examples that deviate from the scope of the present invention. The practical examples and the comparative examples provide the grounds for, for example, the limitations of the numerical values mentioned above.

First, the welding conditions applied when performing welding in the practical examples and the comparative examples will be described. It should be noted that the welding conditions to be described below are merely examples and are not to be limited to the following welding conditions in this embodiment.

The target leg length is set to 6 mm, the welding current is set to 400 amperes (the unit of electric current: A), and the average arc voltage corresponding to the welding current of the electrode is approximately set in the range between 30 volts (the unit of voltage: V) and 35 V inclusive. The arc voltage is changed in a stepwise manner in accordance with the weaving trajectory of the electrode. The welding rate, which is the rate when the welding torch 11 operates, is set to 50 cm/min, and the weaving frequency is set to 2.5 Hz. Furthermore, the weaving width (i.e., the distance from the bottom-plate-side weaving edge to the standing-plate-side weaving edge) is set to 3 mm.

The welding wire used is a soft-steel solid wire and has a diameter of 1.2 mm. The standing plate and the bottom plate used are a general-purpose rolled steel material (SS400) having a thickness of 12 mm. The shield gas used is Ar-20% $CO_2$.

Next, test results obtained in the practical examples and the comparative examples will be described. FIG. 9 illustrates the test results obtained in the practical examples and the comparative examples. In the example shown in FIG. 9, No. 1 to No. 12 are indicated as the practical examples, and No. 13 to No. 15 are indicated as the comparative examples.

Furthermore, FIG. 9 indicates arc voltages during the weaving operation as the welding conditions. As the arc voltages, an "arc-voltage waveform pattern" item, an "average voltage" item, an "arc voltage $V_O$" item, an "arc voltage $V_{Lower}$" item, and an "arc voltage $V_{Upper}$" item are set.

The "arc-voltage waveform pattern" indicates a waveform pattern of the arc voltage during the weaving operation. It is assumed that the waveform shown in FIG. 7A is pattern A, the waveform shown in FIG. 7B is pattern B, and the waveform shown in FIG. 7C is pattern C. The "average voltage" indicates an average value of the arc voltage during welding.

The "are voltage $V_O$" indicates an arc voltage value at the welding-line center position (i.e., a welding-line-center voltage value). The "arc voltage $V_{Lower}$" indicates an arc voltage value at the bottom-plate-side weaving edge (i.e., a bottom-plate-side voltage value). Moreover, the ratio of the arc voltage $V_{Lower}$ to the arc voltage $V_O$ (arc voltage $V_{Lower}$/arc voltage $V_O$) is indicated in percentage. The "arc voltage $V_{Upper}$" indicates an arc voltage value at the standing-plate-side weaving edge (i.e., a standing-plate-side voltage value). Moreover, the ratio of the arc voltage $V_{Upper}$ to the arc voltage $V_O$ (arc voltage $V_{Upper}$/arc voltage $V_O$) is indicated in percentage.

In the practical examples and the comparative examples, tests are performed by changing these arc voltages approximately in the range between 30 V and 35 V inclusive, as described above.

As evaluation results, the status after the welding process is evaluated based on three items, namely, a "flank angle" item, a "spatter-adhesion-induced appearance defect" item, and a "welding defect" item.

Figure 10:
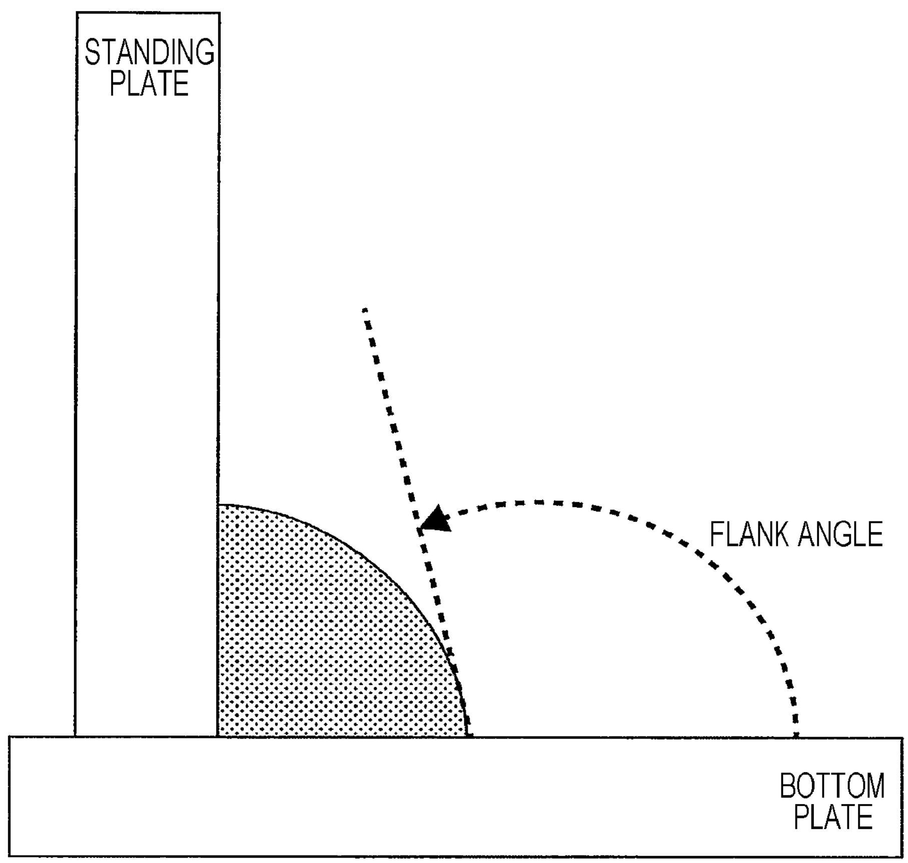
FIG. 10 is a diagram for explaining a flank angle.

The "flank angle" item indicates a result obtained by performing an evaluation based on the flank angle, which is one of indicators for evaluating the shape of a weld toe (i.e., a portion where the surface of a base material and the surface of a weld bead meet). FIG. 10 is a diagram for explaining the flank angle. As shown in the drawing, the flank angle is an angle at which a bead rises from a weld toe. In the practical examples, the flank angle at the bottom plate side is measured and evaluated. Normally, a smooth and favorable bead shape is obtained as the flank angle increases. Therefore, since an overlap occurs when the flank angle falls below 90 degrees, and the throat, thickness (i.e., the thickness of the molten metal in cross section) becomes insufficient when the flank angle exceeds 150 degrees, a poor evaluation result denoted by "X" is obtained. When the flank angle is between 90 degrees and 150 degrees inclusive, a fair evaluation result denoted by a circle is obtained. Furthermore, when the flank angle is between 110 degrees and 135 degrees inclusive, it is determined that a more favorable toe shape is obtained so that a satisfactory evaluation result denoted by a double circle is obtained.

In the "spatter-adhesion-induced appearance defect" item, a satisfactory evaluation result denoted by a double circle is obtained when the adhered spatter is 1.0 mm or smaller in a range defined by a weld length of 50 mm, 25 mm toward the bottom plate from the welding line, and 25 mm toward the standing plate, and a fair evaluation result denoted by a circle is obtained when there are one to five adhered spatters larger than 1.0 mm. Moreover, when there are more than five spatters larger than 1.0 mm, it is determined that the spatter-adhesion-induced appearance defect is excessive and a poor evaluation result denoted by "X" is obtained.

The "welding defect" item indicates a result obtained by the tester visually checking the bead and observing the macroscopic cross section thereof after the welding process. If the occurrence of a welding defect, such as an undercut or an overlap, is confirmed as a result of a bead appearance check or macroscopic cross-section observation, a poor evaluation result denoted by "X" is obtained. If no welding defect has occurred and a fair evaluation result is obtained, a circle is given.

As the arc-voltage welding conditions in the practical examples No. 1 to No. 12, the waveform has any one of patterns A to C, the arc voltage $V_{Upper}$ is lower than or equal to the arc voltage $V_O$, the arc voltage $V_{Lower}$ is higher than or equal to the arc voltage $V_O$, and the arc voltage $V_{Upper}$ is lower than the arc voltage $V_{Lower}$. As a result, a favorable bead shape having a satisfactory flank angle and good appearance with only a small amount of spatter adhesion and without welding defects is obtained. Specifically, the evaluation results for No. 1 to No. 12 are all satisfactory and are given a circle or a double circle with respect to the "flank angle" item, the "spatter-adhesion-induced appearance defect" item, and the "welding defect" item.

In particular, in No. 1 to No. 4, the value of arc voltage $V_{Lower}$/arc voltage $V_O$ ranges between 100% and 125% inclusive, and the value of arc voltage $V_{Upper}$/arc voltage $V_O$ ranges between 85% and 100% inclusive. Furthermore, the arc-voltage waveform has pattern A. As a result, the flank angle is within a more appropriate range so that a satisfactory evaluation result denoted by a double circle is obtained, and the amount, of spatter adhesion is small so that a satisfactory evaluation result denoted by a double circle is obtained, whereby a more satisfactory result is obtained.

In No. 5, the value of arc voltage $V_{Lower}$/arc voltage $V_O$ ranges between 100% and 125% inclusive, and the value of arc voltage $V_{Upper}$/arc voltage $V_O$ ranges between 85% and 100% inclusive. Furthermore, the arc-voltage waveform has pattern B. In this case, the flank angle is also within a more appropriate range so that a satisfactory evaluation result denoted by a double circle is obtained, and the amount of spatter adhesion is small so that a satisfactory evaluation result denoted by a double circle is obtained, whereby a more satisfactory result is obtained.

In No. 6 to No. 9, the value of arc voltage $V_{Lower}$/arc voltage $V_O$ ranges between 100% and 125% inclusive, and the value of arc voltage $V_{Upper}$/arc voltage $V_O$ ranges between 85% and 100% inclusive. In other words, in No. 6, the value of arc voltage $V_{Lower}$/arc voltage $V_O$ is an upper limit value (125%) of the more preferable range. In No. 7, the value of arc voltage $V_{Lower}$/arc voltage $V_O$ is a lower limit value (100%) of the more preferable range. In No. 8, the value of arc voltage $V_{Upper}$/arc voltage $V_O$ is a lower limit value (85%) of the more preferable range. In No. 9, the value of arc voltage $V_{Upper}$/arc voltage $V_O$ is an upper limit value (100%) of the more preferable range. On the other hand, the arc-voltage waveforms in No. 6 to No. 9 are neither pattern A nor pattern B, but are pattern C. As a result, the flank angle is within a more appropriate range so that a satisfactory evaluation result denoted by a double circle is obtained, but a fair evaluation result denoted by a circle is obtained with respect to the appearance defect.

In No. 10, the value of arc voltage $V_{Lower}$/arc voltage $V_O$ is 128% and deviates from the more preferable range between 100% and 125% inclusive. In No. 11, the value of arc voltage $V_{Upper}$/arc voltage $V_O$ is 80% and deviates from the more preferable range between 85% and 100% inclusive. Furthermore, in No. 12, the value of arc voltage $V_{Lower}$/arc voltage $V_O$ is 127% and deviates from the more preferable range between 100% and 125% inclusive, and the value of arc voltage $V_{Upper}$/arc voltage $V_O$ is 82% and deviates from the more preferable range between 85% and 100% inclusive. Moreover, the arc-voltage waveforms in No. 10 to No. 12 are neither pattern A nor pattern B, but are pattern C. As a result, a fair evaluation result denoted by a circle is obtained with respect to the flank angle, and a fair evaluation result denoted by a circle is obtained with respect to the appearance defect.

With regard to the comparative examples, in No. 13, control for changing the arc voltage is not performed so that the arc voltage is kept at a substantially fixed value. Thus, the arc voltage $V_{Lower}$, the arc voltage $V_{Upper}$ or, and the arc voltage $V_O$ are identical values. Specifically, although the arc voltage $V_{Upper}$ or is lower than or equal to the arc voltage $V_O$ and the arc voltage $V_{Lower}$ is higher than or equal to the arc voltage $V_O$, the condition of arc voltage $V_{Upper}$ or <arc voltage $V_{Lower}$ is not satisfied. As a result, poor evaluation results denoted by "X" are obtained with respect to the "flank angle" and "spatter-adhesion-induced appearance defect" items, and an overlap has occurred at the bottom plate side.

In No. 14, the value of arc voltage $V_{Upper}$/arc voltage $V_O$ is 100%, and the arc voltage $V_{Upper}$ or is lower than or equal to the arc voltage $V_O$. On the other hand, the value of arc voltage $V_{Upper}$/arc voltage $V_O$ is 88%, the arc voltage $V_{Lower}$ is higher than or equal to the arc voltage $V_O$, and the condition of arc voltage $V_{Upper}$<arc voltage $V_{Lower}$ is not satisfied. As a result, poor evaluation results denoted by "X" are obtained with respect to the "flank angle" and "spatter adhesion-induced appearance defect" items, and an overlap has occurred at the bottom plate side.

In No. 15, the value of arc voltage $V_{Lower}$/arc voltage $V_O$ is 94%, and the value of arc voltage $V_{Upper}$/arc voltage $V_O$ is 112%. Specifically, the arc voltage $V_{Lower}$ is higher than or equal to the arc voltage $V_O$, the arc voltage $V_{Upper}$ is lower than or equal to the arc voltage $V_O$, and the condition of arc voltage $V_{Upper}$<arc voltage $V_{Lower}$ is not satisfied. As a result, a poor evaluation result denoted by "X" is obtained with respect to the "spatter-adhesion-induced appearance defect" item, and an undercut has occurred at the standing plate side.

Accordingly, as the welding conditions, the arc voltage $V_{Lower}$ is set to be higher than or equal to the arc voltage $V_O$, the arc voltage $V_{Upper}$ or is set to be lower than or equal to the arc voltage $V_O$, and the arc voltage $V_{Upper}$ is set to be lower than the arc voltage $V_{Lower}$. Thus, it is confirmed that a favorable flank angle is obtained, spatter-adhesion-induced appearance defects are suppressed, and welding defects, such as overlaps and undercuts, are suppressed. Moreover, by adjusting the values of the arc voltage $V_{Lower}$ and the arc voltage $V_{Upper}$ or by setting the waveform pattern to pattern A or pattern B, it is confirmed that the flank angle is further improved and that the bead appearance is improved owing to suppressed spatter adhesion.

<Hardware Configuration of Robot Controller>

Figure 11:
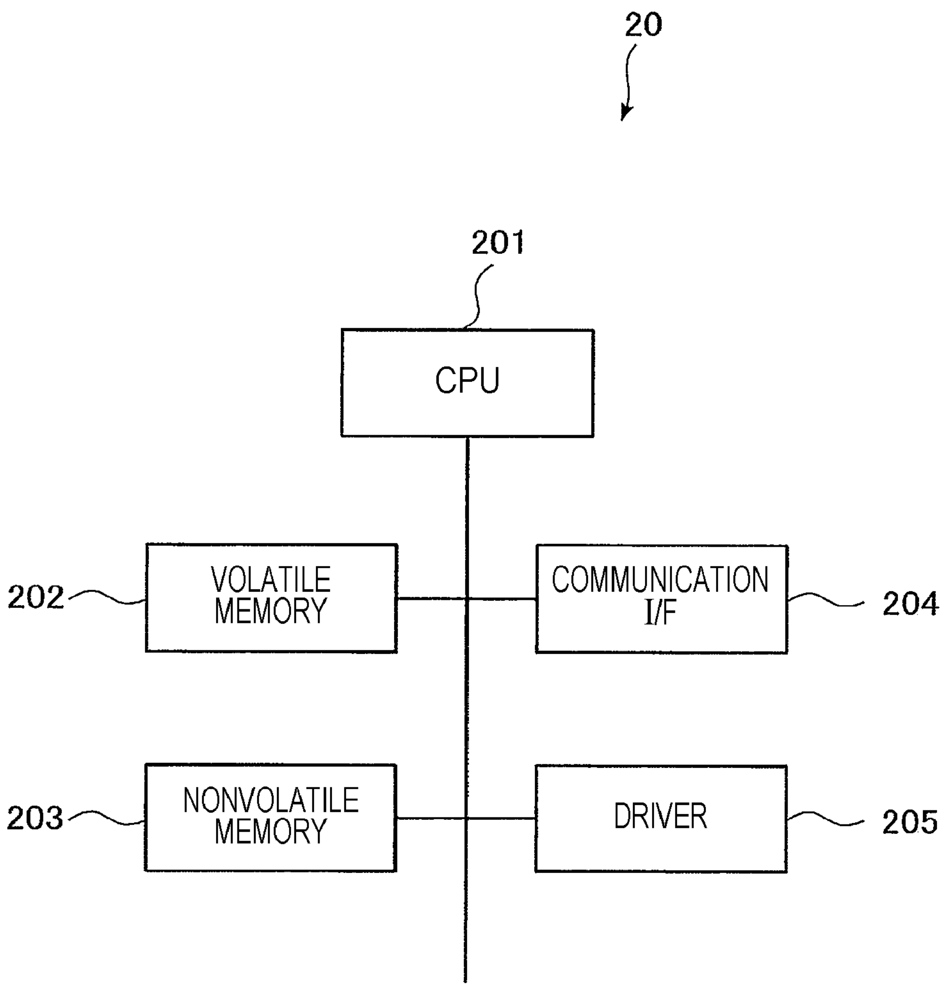
FIG. 11 illustrates a hardware configuration example of the robot controller.

Lastly, the hardware configuration of the robot controller 20 will be described. FIG. 11 illustrates a hardware configuration example of the robot controller 20.

As shown in FIG. 11, the robot controller 20 includes a CPU 201 as arithmetic means, and also includes a volatile memory 202 and a nonvolatile memory 203 as storage regions. The CPU 201 executes various types of programs, such as an OS (operating system) and application software, so as to realize the functions of the robot controller 20. The volatile memory 202 is a storage region that stores, for example, various types of programs and data used for executing the programs. The nonvolatile memory 203 is a storage region that stores, for example, data input to the various types of programs and data output from the various types of programs.

The robot controller 20 further includes a communication interface (referred to as "communication I/F" hereinafter) 204 for communicating with an external unit and a driver 205 for reading and writing data from and to a storage medium.

For example, the CPU 201 executes the various types of programs, such as the OS and the application software, so as to realize the functions of the robot controller 20, thereby performing the arc-voltage control described above.

It should be noted that the hardware configuration in FIG. 11 is merely an example and the robot controller 20 is not limited to the shown configuration. A program that realizes the embodiment of the present invention may be provided by being distributed in a stored state in a magnetic disk, an optical disk, a semiconductor memory, or other types of storage media or by being distributed via a network.

As described above, the welding system 1 according to this embodiment controls the arc voltage such that the arc voltage $V_{Upper}$ at the standing-plate-side weaving edge is lower than or equal to the arc voltage $V_O$ at the welding-line center position, the arc voltage $V_{Lower}$ at the bottom-plate-side weaving edge is higher than or equal to the arc voltage $V_O$ at the welding-line center position, and the arc voltage $V_{Upper}$ is lower than the arc voltage $V_{Lower}$. With such a configuration, for example, the occurrence of inferior bead appearance and welding defects, such as an undercut at the standing plate side and an overlap at the bottom plate side, is suppressed, as compared with a configuration in which a difference in the magnitude of arc voltage is not provided between the standing-plate side and the bottom-plate side.

Although the present invention has been described with reference to the embodiment, the technical scope of the present invention is not limited to the above embodiment. It is obvious to a person skilled in the art that various modifications and alternatives may be employed so long as they do not depart from the spirit and scope of the present invention.

The present application is based on Japanese Patent Application (No. 2015-093672) filed Apr. 30, 2015, the contents of which are incorporated herein by reference.

REFERENCE SIGNS LIST

1 welding system 10 welding robot 11 welding torch 20 robot controller 21 teaching-data storage unit 22 teaching-data interpreting unit 23 robot-trajectory planning unit 24 welding-power-supply I/F processing unit 24*a* weaving-position-information lag correcting unit 24*b* voltage-command generating unit 30 welding power supply 40 feeding device $V_{Lower}$ bottom-plate-side voltage $V_{Upper}$ standing-plate-side voltage $V_O$ welding-line-center voltage

The invention claimed is:

1. A horizontal fillet welding method for performing welding along a welding line by using a junction at which a standing plate and a bottom plate meet as the welding line and causing an electrode to perform a weaving operation with reference to the welding line as a center, the horizontal fillet welding method comprising:

performing control such that an arc voltage at a standing-plate-side weaving edge is lower than or equal to an arc voltage at a welding-line center position, an arc voltage at a bottom-plate-side weaving edge is higher than or equal to the arc voltage at the welding-line center position, and the arc voltage at the standing-plate-side weaving edge is lower than the arc voltage at the bottom-plate-side weaving edge, wherein the arc voltage at the standing-plate-side weaving edge is a value within a range between 85% and 100% inclusive relative to the arc voltage at the welding-line center position, and wherein the arc voltage at the bottom-plate-side weaving edge is a value within a range between 115% and 120% inclusive relative to the arc voltage at the welding-line center position.

2. The horizontal fillet welding method according to claim 1, wherein an arc voltage when the electrode moves at the standing plate side and the bottom plate side changes in any one of three manners including a linear manner, a stepwise manner, and a curved manner or in a combination of two or more manners of the three manners in synchronization with the weaving operation.

3. The horizontal fillet welding method according to claim 1, wherein when a distance between a position of the electrode and the standing-plate-side weaving edge during the weaving operation is within a range of ¼ of a distance between the standing-plate-side weaving edge and the welding-line center position, the arc voltage is controlled to a value within a predetermined range as a voltage at the standing-plate-side weaving edge, and wherein when a distance between the position of the electrode and the bottom-plate-side weaving edge is within a range of ¼ of a distance between the bottom-plate-side weaving edge and the welding-line center position, the arc voltage is controlled to a value within a predetermined range as a voltage at the bottom-plate-side weaving edge.

4. A horizontal fillet welding system comprising: a horizontal fillet welding device that performs welding along a welding line by using a junction at which a standing plate and a bottom plate meet as the welding line and causing an electrode to perform a weaving operation with reference to the welding line as a center; and a control device that controls the horizontal fillet welding device such that an arc voltage at a standing-plate-side weaving edge is lower than or equal to an arc voltage at a welding-line center position, an arc voltage at a bottom-plate-side weaving edge is higher than or equal to the arc voltage at the welding-line center position, and the arc voltage at the standing-plate-side weaving edge is lower than the arc voltage at the bottom-plate-side weaving edge, wherein the arc voltage at the standing-plate-side weaving edge is a value within a range between 85% and 100% inclusive relative to the arc voltage at the welding-line center position, and wherein the arc voltage at the bottom-plate-side weaving edge is a value within a range between 115% and 120% inclusive relative to the arc voltage at the welding-line center position.

5. A horizontal fillet welding system that performs welding along a welding line by using a junction at which a standing plate and a bottom plate meet as the welding line and causing an electrode to perform a weaving operation with reference to the welding line as a center, the horizontal fillet welding system comprising:

weaving-position commanding means that commands a position where the electrode is to perform the weaving operation based on teaching data in which a welding condition is set;

position-information generating means that generates position information of the electrode that has moved in accordance with a command of the weaving-position commanding means; and arc-voltage controlling means that performs voltage control in synchronization with the weaving operation of the electrode based on the position information generated by the position-information generating means and that performs control such that an arc voltage at a standing-plate-side weaving edge is lower than or equal to an arc voltage at a welding-line center position, an arc voltage at a bottom-plate-side weaving edge is higher than or equal to the arc voltage at the welding-line center position, and the arc voltage at the standing-plate-side weaving edge is lower than the arc voltage at the bottom-plate-side weaving edge, wherein the arc voltage at the standing-plate-side weaving edge is a value within a range between 85% and 100% inclusive relative to the arc voltage at the welding-line center position, and wherein the arc voltage at the bottom-plate-side weaving edge is a value within a range between 115% and 120% inclusive relative to the arc voltage at the welding-line center position.

6. The horizontal fillet welding system according to claim 5, wherein the position-information generating means generates information indicating an actual position of the electrode, as the position information of the electrode, based on the command of the weaving-position commanding means and a time period from when the command is performed to when the electrode actually reaches a commanded position.

7. A non-transitory computer readable medium including a computer executable program used in a horizontal fillet welding system that performs welding along a welding line by using a junction at which a standing plate and a bottom plate meet as the welding line and causing an electrode to perform a weaving operation with reference to the welding line as a center, the computer executable program causing the horizontal fillet welding system to realize a function of performing control such that an arc voltage at a standing-plate-side weaving edge is lower than or equal to an arc voltage at a welding-line center position, an arc voltage at a bottom-plate-side weaving edge is higher than or equal to the arc voltage at the welding-line center position, and the arc voltage at the standing-plate-side weaving edge is lower than the arc voltage at the bottom-plate-side weaving edge, wherein the arc voltage at the standing-plate-side weaving edge is a value within a range between 85% and 100% inclusive relative to the arc voltage at the welding-line center position, and wherein the arc voltage at the bottom-plate-side weaving edge is a value within a range between 115% and 120% inclusive relative to the arc voltage at the welding-line center position.

* * * * *